US008223183B2

(12) United States Patent
Hori et al.

(10) Patent No.: US 8,223,183 B2
(45) Date of Patent: Jul. 17, 2012

(54) IMAGE FORMATION DEVICE AND IMAGE FORMATION METHOD

(75) Inventors: Fumihisa Hori, Iwate (JP); Chikashi Osakama, Iwate (JP); Hiroyuki Murayama, Iwate (JP)

(73) Assignee: Citizen Holdings Co., Ltd., Tokyo (JP)

( * ) Notice: Subject to any disclaimer, the term of this patent is extended or adjusted under 35 U.S.C. 154(b) by 1098 days.

(21) Appl. No.: 11/849,599

(22) Filed: Sep. 4, 2007

(65) Prior Publication Data

US 2008/0056767 A1 Mar. 6, 2008

(30) Foreign Application Priority Data

Sep. 1, 2006 (JP) ................................. 2006-237814

(51) Int. Cl.
*B41J 2/435* (2006.01)
*B41J 2/47* (2006.01)
*G01D 15/14* (2006.01)

(52) U.S. Cl. ........................................ 347/224; 347/225

(58) Field of Classification Search .................. 347/224, 347/225

See application file for complete search history.

(56) References Cited

U.S. PATENT DOCUMENTS 7,172,991 B2 * 2/2007 Anderson et al. ............. 503/206
7,333,126 B2 * 2/2008 Taugher et al. ............... 347/224
7,393,623 B2 * 7/2008 Conroy et al. ............. 430/270.1
7,596,067 B2 * 9/2009 Hanks et al. ................. 369/53.1
2009/0135688 A1 * 5/2009 Takeshima ................... 369/47.1

FOREIGN PATENT DOCUMENTS

JP 2002-203321 A 7/2002
JP 2003-257153 A 9/2003
JP 2005-128453 A 5/2005
JP 2006-134426 A 5/2006

OTHER PUBLICATIONS

Japanese Office Action dated Jun. 1, 2010, issued in corresponding Japanese Patent Application No. 2006-237814.

* cited by examiner

*Primary Examiner* — Uyen Chau N Le
*Assistant Examiner* — John M Bedtelyon
(74) *Attorney, Agent, or Firm* — Westerman, Hattori, Daniels & Adrian, LLP

(57) ABSTRACT

When forming an image by developing a color development layer that reacts to a light, the image formation processes (color development, color erasure, and/or fixing) that can be performed simultaneously with information recording are performed in the same period as that of the information recording to reduce the time required for image formation. An image formation device that forms an image by developing a color development layer reacting to a light comprises a color development unit that develops colors by focusing a light on the color development layer, color erasure units that selectively erase the developed colors by focusing a light on the developed color development layer, and a fixing unit that fixes an image formed by the color erasure wherein the color development unit and/or the fixing unit performs processing in a period in which information is recorded on the recording medium on which the color development layer is provided.

6 Claims, 7 Drawing Sheets

IMAGE FORMATION DEVICE AND IMAGE FORMATION METHOD

BACKGROUND OF THE INVENTION

1. Field of the Invention

The present invention relates to an image formation device, and more particularly to an image formation device that forms an image on the surface of a disc-shaped recording medium.

2. Description of the Related Art

Various types of disc-shaped recording media, such as a CD, CD-R, CD-RW, DVD, and DVD-RAM, are known as recording media for recording electronic data such as images, videos, music, and documents. When various types of data are written for recording on any of those disc-shaped recording media, the information indicating the recorded content, for example, a title, is sometimes recorded on the surface of the disc-shaped recording medium to allow the user to visually recognize the content recorded on the disc-shaped recording medium.

In this case, the user usually writes the information directly on the surface of a disc-shaped recording medium with a writing implement. In some other case, the user prints the recording information on a separately prepared label paper with a printer and pastes this label paper on the surface of the disc-shaped recording medium.

There are the following problems with the methods described above. That is, when the user writes the information directly on the surface of a disc-shaped recording medium, there is a possibility that the information recording surface of the recording medium is damaged by a writing implement. When the recording information is recorded on label paper with a printer, the printer is separately required.

To solve those problems, an optical disc drive is proposed that uses a laser beam to form an image on the label side to eliminate the need for writing the information with a writing implement and for printing the information with a printer (Patent Document 1).

According to the printer disclosed in this document, an optical disc on which a visible-light characteristic change layer made of a light-sensitive material and a heat-sensitive material is formed in a position that can be seen from the label side, is set on the turn table of an optical disc drive with the label side facing the optical pickup. The optical disc and the optical pickup are relatively moved along the surface of the optical disc and, in synchronization with this movement, the power of the laser beam projected from the optical pickup is modulated according to image data such as characters and pictures to be formed into images, and the modulated beam is focused on the visible-light characteristic change layer. Focusing a laser beam in this way changes the visible-light characteristic of the visible-light characteristic change layer and, as a result, forms an image.

The printer described in Document 1 given above performs the point-sequential scan operation, in which the optical disc and the optical pickup are relatively moved spirally or concentrically along the optical disc surface for printing, one pixel at a time, to form an image on the optical disc surface. The problem with this method is that it takes long.

In contrast to the point-sequential scan operation described above, another recording method is known in which the recording heads are arranged in all directions from the center of a disc-shaped recording medium to sequentially perform linear recording in synchronization with the rotation of the recording medium. A recording device is also proposed that uses inkjet recording heads as the linearly arranged recording heads to print an image on the disc medium surface while the recording medium is rotating (Patent Document 2).

In addition, to allow a label on an information recording medium to be rewritten, a label is also proposed that has a color development layer, which contains photo-chromic compounds as the color development material of the label, on its substrate to enable the light of a predetermined wavelength to be focused on this color development layer to change the hue (Patent Document 3).

[Patent Document 1] Japanese Patent Laid-Open Publication No. 2002-203321

[Patent Document 2] Japanese Patent Laid-Open Publication No. 2003-257153

[Patent Document 3] Japanese Patent Laid-Open Publication No. 2005-128453

On a disc-shaped recording medium, not only data is written on the information recording side to record information but also images such as pictures or characters are formed on the label side as described above.

Information is recorded, and images are formed, on a disc-shaped recording medium that is being rotated. At this time, information is recorded spirally or concentrically by relatively moving the disc-shaped recording medium and the optical pickup along the surface of the recording medium.

Known methods for recording information on a disc-shaped recording medium include the linear speed control method, angular speed control method, and linear/angular speed control method. For example, the linear speed control method refers to a method in which the rotation of a disc-shaped recording medium is controlled so that the linear speed in the center side of the disc is the same as the linear speed in the peripheral side, and the angular speed control method refers to a method in which the rotation of a disc-shaped recording medium is controlled so that the rotation angle of the disc is constant.

When a disc-shaped recording medium is rotated at a constant rotation speed, the recording density differs between the center side of the disc and the peripheral side because the linear speed of the disc differs between the center side and the peripheral side. On the other hand, the linear speed control method makes the recording medium recording density even by controlling the rotation of a disc-shaped recording medium so that the linear speed in the center side of the disc is the same as the linear speed in the peripheral side.

On the other hand, when an image is formed on the label side by the linearly-arranged recording heads, the recording heads are arranged along the radial direction of the disc-shaped recording medium and therefore the recording medium is usually controlled by the angular speed control method so that the rotation angle is constant. In this configuration, the image write processing for forming an image includes a process that is difficult to perform at a high speed.

In contrast, when data is written for recording information, the rotation speed is usually increased to reduce the recording time.

So, the image formation processing, which includes a process that is difficult to perform at a high speed, cannot be performed at the speed of the data write processing for information recording. This means that the information recording processing and the image formation processing are difficult to be performed at the same time and so they must be performed separately.

There is a need for reducing the time required for the image formation processing but, because the information recording processing and the image formation processing must be performed separately, it difficult to reduce the processing time for the image formation processing.

FIG. 7 is a diagram showing the relation between the processing time of image formation and that of the information recording described above. FIG. 7 shows the image formation processing in which light is focused on a recording medium on which the color development layer is provided. To form a multi-color image on a recording medium on which the color development layer containing photochromic compounds is provided, a light (ultraviolet radiation) of a predetermined wavelength is focused on the color development layer to develop the colors and, after that, the lights (multiple visible lights) of predetermined wavelengths different from that for color development are focused for color erasure. An image is drawn using the parts where colors are not erased and, after that, the image is fixed and stabilized.

Information recording and image formation are performed in one of the following sequences: image formation is performed after information recording as shown in FIG. 7A and information recording is performed after image formation as shown in FIG. 7B. In any of the sequences, it is difficult to reduce the time Tg required for image formation because information recording and image formation are performed individually.

SUMMARY OF THE INVENTION

It is an object of the present invention to solve the problems of the prior art which are described above. More specifically, an object of the present invention is to reduce the time required for image formation when information is recorded and an image is formed on a recording medium.

In particular, it is an object of the present invention to reduce the time required for image formation in which colors are developed by focusing a light of a predetermined wavelength, the developed color is selectively erased by focusing lights of predetermined wavelengths to draw an image, and the drawn image is fixed.

The present invention provides an image formation device and an image formation method that use a recording unit for recording information and that form an image by developing a color development layer on the recording medium on which the color development layer reacting to a light is provided. The image formation processes (color development, color erasure, and/or fixing) that can be performed simultaneously with information recording are performed in the same period as that of the information recording to reduce the time required for image formation.

The present invention includes a device category and a method category. The device category includes embodiments of an image formation device and a recording medium device, and the method category includes embodiments of an image formation method and an addition processing method that adds information and an image to the recording medium.

The embodiment of the image formation device of the present invention has a recording unit for recording information and forms an image by developing a color development layer on a recording medium wherein the color development layer reacts to a light. The image formation device comprises a color development unit that develops colors by focusing a light on the color development layer; color erasure units that selectively erase the developed colors by focusing a light on the developed color development layer; and a fixing unit that fixes an image formed by the color erasure wherein the color development unit or the fixing unit performs processing in a period in which information is recorded on the recording medium.

The recording unit has at least two information recording periods, processing of the color development unit is performed in a first information recording period, and processing of the fixing unit is performed in a second information recording period.

The embodiment of the image formation device of the present invention forms an image by developing a color development layer that reacts to a light. The image formation device comprises a rotation unit that rotates a disc-shaped recording medium that has a color development layer; a color development unit that develops colors by focusing a first light on the color development layer; color erasure units that selectively erase the developed colors and write an image by focusing a second light on the developed color development layer; and a fixing unit that fixes the image formed by the color erasure. Out of the color development unit, the color erasure unit, and the fixing unit, the color development unit and the fixing unit perform processing in a period in which data is written on the disc-shaped recording medium and, in this way, the information recording and a part of the image formation are performed simultaneously for reducing the time required for the image formation.

The color development layer is formed by applying a color development material containing photochromic compounds onto a disc-shaped recording medium. The color development unit comprises light focusing means for focusing a first light within a predetermined angular range on the recording medium, the color erasure units each comprise optical focusing means for focusing a second light of a wavelength different from a wavelength of the first light within a predetermined angular range on the recording medium, and the fixing unit comprises heating means for heating the recording medium to a predetermined temperature.

The light focusing means of the color development unit focuses, for example, ultraviolet radiation, and the color development layer develops colors when exposed to the ultraviolet radiation. The color development unit has a light source that focuses ultraviolet radiation for developing the color development material, and the color erasure unit may be configured in such a way that multiple optical units, which erase colors of different wavelengths, in the rotation direction. Each of the optical units of the color erasure unit have alight source that focuses a visible light or an infrared light to erase the colors developed from the color development material.

Photochromic compounds that develop C (cyan), M (magenta), and Y (yellow) by ultraviolet radiation may be used as the color development material.

The light focusing means of the color erasure unit focuses visible lights of several types of wavelengths for erasing developed colors corresponding to the wavelengths of the developed colors. This color erasure draws an image according to the wavelengths and the intensities of the focused visible lights and forms an image by an unerased part of the developed colors.

When a color development material containing photochromic compounds that develop C (cyan), M (magenta), and Y (yellow) is used, three color erasure units are provided for color printing: a first color erasure unit that emits the visible light of R (red) to erase C (cyan), a second color erasure unit that emits the visible light of G (green) to erase M (magenta), and a third color erasure unit that emits the visible light of B (blue) to erase Y (yellow).

The heating means of the fixing unit fixes the developed colors by heating this color development layer to a temperature equal to or higher than a predetermined temperature.

Out of the color development unit, color erasure unit, and fixing unit used for image formation, the color erasure unit controls a disc-shaped recording medium in the angular-speed control mode to create an image on the label side. On the other hand, the color development unit simply focuses a light of a predetermined wavelength, for example, ultraviolet radiation, on the color development layer regardless of the position on the recording medium, and the fixing unit simply sets the temperature of the recording medium to a temperature equal to or higher than a predetermined temperature. Therefore, the color development unit and the fixing unit can perform processing regardless of the control mode (angular-speed control mode or linear-speed control mode) of the rotation of the disc-shaped recording medium and regardless of the rotation speed.

Therefore, the color development unit and the fixing unit can perform processing simultaneously with information recording in the period in which information is recorded on the recording medium. With focus on this, the present invention performs the processing of at least one of the color development unit and the fixing unit in the period in which information is recorded on the recording medium to allow a part of time for image formation to be included in the time for information recording, thus reducing the image formation processing time.

The recording medium device of the present invention, which comprises an image formation device and an information recording device for writing information, adds information and an image to a disc-shaped recording medium.

The recording medium device of the present invention comprises an image formation unit that forms an image on a disc-shaped recording medium, an information recording unit that writes information, and a rotation unit that rotates the recording medium.

Like the image formation device, the image formation unit comprises a color development unit that develops colors by focusing a light on the color development layer provided on the recording medium, color erasure units that selectively erase the developed colors by focusing a light on the color development layer from which colors are developed, and a fixing unit that fixes the image formed by the color erasure units. The rotation unit of the present invention can be controlled in any of the speed control modes; linear-speed control, angular-speed control, and linear-speed/angular-speed control.

The embodiment of the image formation method of the present invention uses a recording unit for recording information and forms an image by developing a color development layer on a recording medium wherein the color development layer reacts to a light. The image formation method comprises the steps of developing colors by focusing a light on the color development layer; selectively erasing the developed colors by focusing a light on the developed color development layer; and fixing an image formed by the color erasure. The step of developing colors or the step of fixing performs processing in a period in which information is recorded on the recording medium.

The recording unit has at least two information recording periods for recording information on the recording medium, processing of a color development unit is performed in a first information recording period, and processing of a fixing unit is performed in a second information recording period.

The image formation method of the present invention uses a recording unit for recording information and forms an image by developing a color development layer on a recording medium wherein the color development layer reacts to a light. With the color development layer provided on a disc-shaped recording medium and with the disc-shaped recording medium rotating, the image formation method comprises the steps of developing colors by focusing a first light on the color development layer; selectively erasing the developed colors by focusing a second light on the developed color development layer for writing an image; and fixing the image formed by the color erasure. The step of developing colors or the step of fixing are performed in a period in which information is recorded on the disc-shaped recording medium.

The image formation method according to the present invention performs information recording and a part of image formation simultaneously to reduce the time required for image formation.

The color development layer is formed by applying a color development material containing photochromic compounds onto a disc-shaped recording medium. In the color development step, a first light is focused within a predetermined angular range on the recording medium. In the color erasure step, a second light of a wavelength different from a wavelength of the first light is focused within a predetermined angular range on the recording medium. In the fixing step, the recording medium is heated to a predetermined temperature.

In the color development step, ultraviolet radiation is focused on the color development layer that develops colors when exposed to the ultraviolet radiation. In the color erasure step, visible lights of various types of different wavelengths are focused to erase developed colors whose wavelengths are the same as those of the focused visible lights. This color erasure draws an image according to the wavelengths and intensities of the focused visible lights and forms the image with the developed colors that are not erased.

In the fixing step, the color development layer is heated to a temperature equal to or higher than a predetermined temperature to stabilize the developed colors for fixing.

Out of the color development step, color erasure step, and fixing step performed for image formation, the color erasure step controls a disc-shaped recording medium in the angular-speed control mode to create an image on the label side. On the other hand, the color development step simply focuses a light of a predetermined wavelength, for example, ultraviolet radiation, on the color development layer regardless of the position on the recording medium, and the fixing step simply sets the temperature of the recording medium to a temperature equal to or higher than a predetermined temperature. Therefore, the color development step and the fixing step can perform processing regardless of the control mode (angular-speed control mode, linear-speed control mode, or linear-speed/angular-speed control) of the rotation of a disc-shaped recording medium and regardless of the rotation speed.

Therefore, the color development step and the fixing step can be performed in the period in which data is written for information recording on the recording medium. With focus on this, the present invention performs the processing of at least one of the color development step and the fixing step in the period in which information is recorded on the recording medium to allow a part of the time for image formation to be included in the time for information recording, thus reducing the image formation processing time.

The addition processing method of the present invention performs image formation for forming an image on a disc-shaped recording medium and information recording for writing information to add the image and the information to the recording medium. With the recording medium rotating, the image formation comprises the steps of developing colors by focusing a light on the color development layer provided on the recording medium; selectively erasing the developed colors by focusing a light on the developed color development layer; and fixing the image formed by the color erasure.

The image formation device and image formation method according to the present invention reduce the time required for image formation when information is recorded and an image is formed on a recording medium.

Image formation performed by focusing a light of a predetermined wavelength to develop colors, focusing lights of predetermined wavelengths to erase the developed colors for drawing, and fixing the drawing to form an image can reduce the time required for the image formation.

DETAILED DESCRIPTION OF THE PREFERRED EMBODIMENTS

Figure 1A:
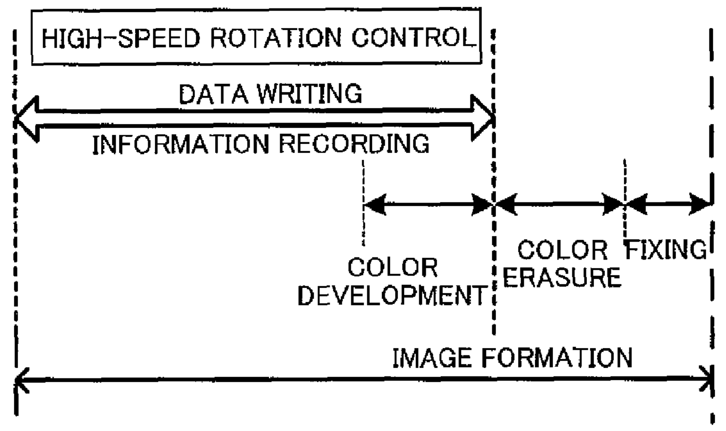
FIG. 1 is a diagram showing the processing time for image formation in the present invention.

An image formation device and an image formation method according to the present invention will be described below in detail with reference to the drawings.

FIG. 1 is a diagram showing the processing time required for image formation according to the present invention. The figure shows the relation between information recording and image formation on a recording medium.

In forming an image on a disc-shaped recording medium, the present invention performs a part of image formation processes in a period, during which information is recorded on a recording medium, to reduce the time required for image formation.

In the description below, it is assumed that a disc-shaped recording medium has a color development layer, created by applying a color development material that contains photochromic compounds, on the side that is a label side. An image is formed on this recording medium in the following three processes; color development process for developing the color development layer, color erasure process for selectively erasing the developed colors for drawing an image using the unerased developed colors, and fixing process for fixing the developed colors that remain unerased in the color erasure process.

In the color development process, a light of the wavelength for developing the color development material is focused within a predetermined angular range on the recording medium. In the color erasure process, lights of the wavelengths for erasing the developed colors are focused within a predetermined angular range on the recording medium. In the fixing process, the recording medium is heated to a predetermined temperature to stabilize the developed colors.

As the color development material, a material containing photochromic compounds, which develop C (cyan), M (magenta), and Y (yellow) with ultraviolet radiation, can be used. When this color development material containing the photochromic compounds is used, C (cyan) is erased by focusing the visible light of R (red), M (magenta) is erased by focusing the visible light of G (green), and Y (yellow) is erased by focusing the visible light of B (blue). A color image can be formed by selectively erasing the colors with the use of those three visible lights after all colors are developed by ultraviolet radiation.

The color development process and the fixing process, included in the image formation processes, can be performed simultaneously with information recording in the period when information is recorded on the recording medium.

The reason is as follows. The rotation of the recording medium is controlled by the linear-speed control when information is recorded on a disc-shaped recording medium while the rotation of the recording medium is controlled by the angular-speed control in the color erasure process that is one of the processes of image formation on the label side on the recording medium. Therefore, the information recording and the image formation cannot be performed simultaneously in the color erasure process. On the other hand, because the color development process and the fixing process, which are also processes of image formation, do not depend on the rotation speed of the recording medium and any of the linear-speed control and the angular-speed control can be used for those processes.

Figure 1B:
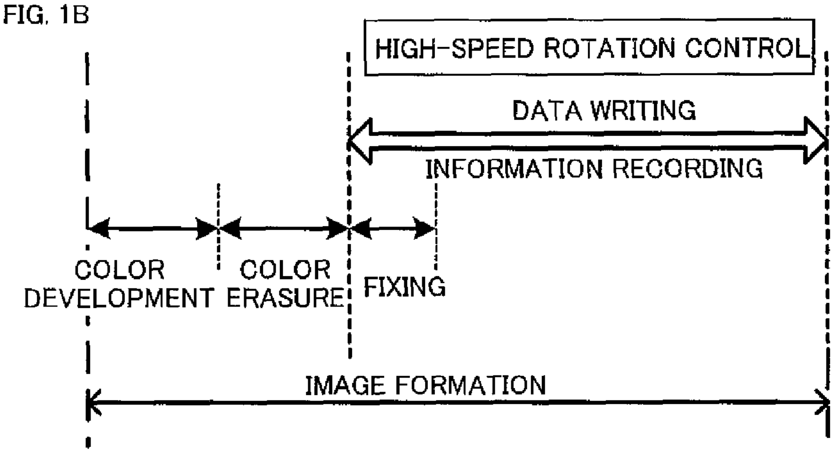
Figure 1C:
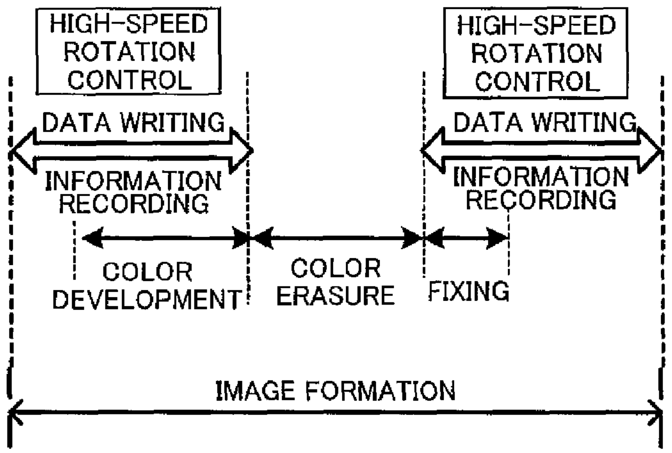

The color development process and/or the fixing process is performed simultaneously with the information recording in one of three modes, shown in FIG. 1A to FIG. 1C, in the period when information is recorded on the recording medium.

FIG. 1A shows an example of the mode in which the color development process is performed in the period in which information is recorded. In the information recording period, the disc-shaped recording medium is rotated at a high speed and data is written in this period. The color development process of the image formation is also performed in this period. After the information recording is completed, the rotation speed of the recording medium is changed to the rotation speed suitable for image writing by the color erasure process and, after the color erasure process, the fixing process that is the rest of the image formation is performed.

FIG. 1B shows an example of the mode in which the fixing process is performed in the period in which information is recorded. The color development process is performed first and, after that, the rotation speed of the disc-shaped recording medium is changed to the rotation speed for image writing by the color erasure process to perform the color erasure process of the image formation. After the color erasure process is terminated, the rotation speed of the recording medium is changed to the high speed and data is written for information recording and, at the same time, the fixing process that is the rest of the image formation is performed.

FIG. 1C shows an example of the mode in which the color development process and the fixing process are performed in the period in which information is recorded. In this example, the information recording period is divided into two periods, and the color erasure process is performed between the two information recording periods (first information recording period and second information recording period).

In the first information recording period in which information is recorded, the disc-shaped recording medium is rotated at a high speed and, during this period, data is written and at the same time the color development process of the image formation is performed. After the color development process is terminated, the rotation speed of the recording medium is changed to the rotation speed for image writing by the color erasure process and the color erasure process is performed. After the color erasure process is terminated, the rotation speed of the recording medium is changed again to the high speed to create the second information recording period and, during this period, data is written and at the same time the fixing process of the image formation is performed.

According to the modes described above, the color development process, one of the processes of the image formation, can be performed in the information recording period and, therefore, the processing time of the image formation can be reduced. The total time of the information recording and the image formation can also be reduced.

Figure 2:
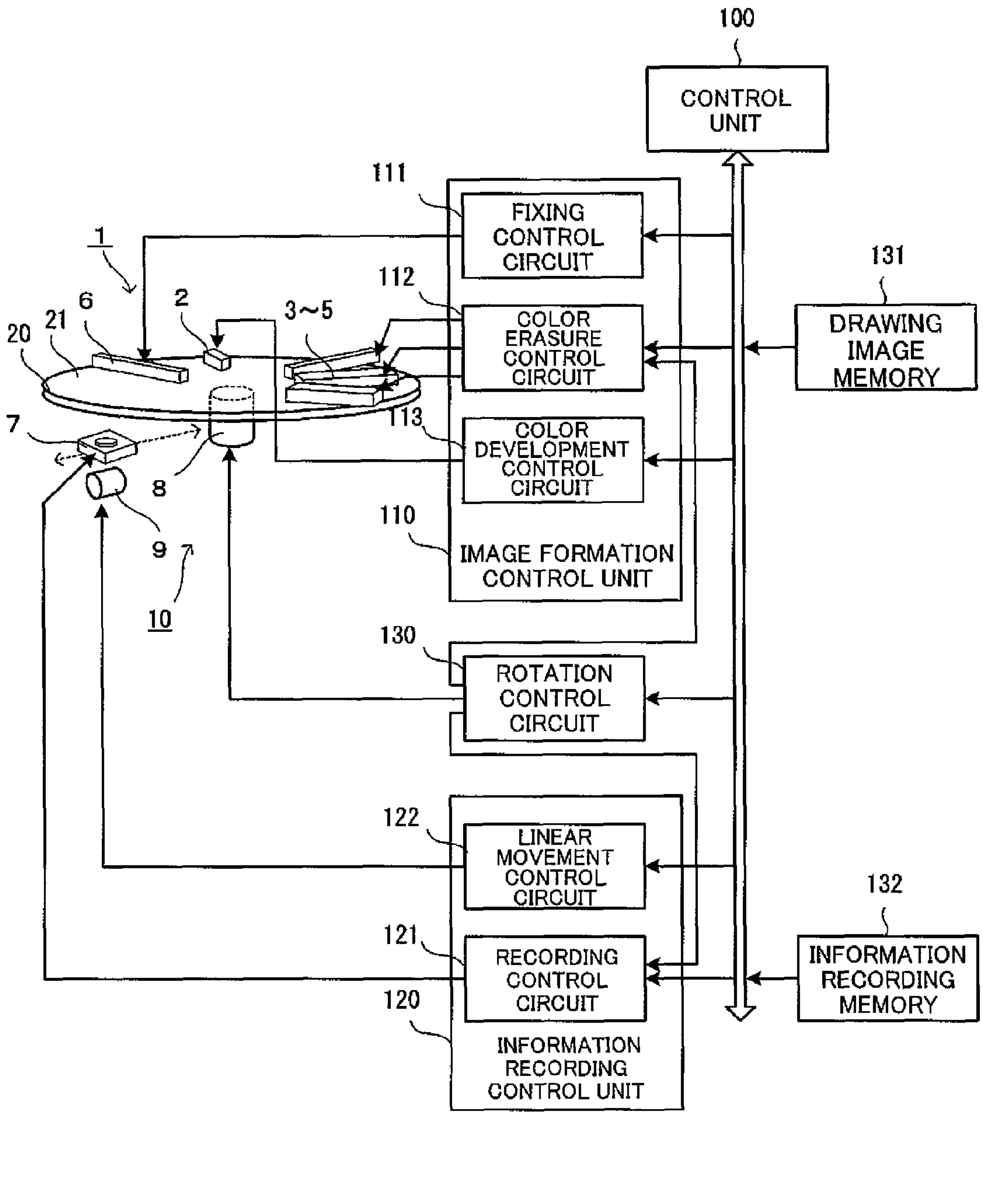
FIG. 2 is a diagram showing an example of the configuration in which an image is formed in the present invention.

The following describes an example of the configuration in which an image is formed in the present invention with reference to FIG. 2. Note that the configuration shown in FIG. 2 is exemplary and the present invention is not limited to the configuration shown.

Referring to FIG. 2, an image formation device 1 of the present invention includes a configuration for forming an image on a label side 21 of a disc-shaped recording medium 20. A recording medium device 10 of the present invention includes a configuration for forming an image by means of the image formation device 1 and a configuration for writing data for information recording.

The image formation device 1 has a color development unit 2, first to third color erasure units 3-5, and a fixing unit 6 in the positions opposed to the label side 21 of the disc-shaped recording medium 20. Those units are controlled by an image formation control unit 110.

The color development unit 2 focuses a light of a particular wavelength, for example, ultraviolet radiation, on a color development layer, which is created on the label side 21 of the recording medium 20 by applying a color development material containing photochromic compounds, for developing the color development material. When the color development material contains photochromic compounds that develop C (cyan), M (magenta), and Y (yellow) by ultraviolet radiation, the full color develops by focusing ultraviolet radiation on the color development layer.

For example, the first to third color erasure units 3-5 focus the visible light of R (red), the visible light of G (green), and the visible light of B (blue) to erase C (cyan), M (magenta), and Y (yellow), respectively, from the colors that develop by ultraviolet radiation. This color erasure, which corresponds to the drawing processing, forms an image.

The fixing unit 6 is heating means that heats the color development layer to a temperature equal to or higher than a predetermined temperature to stabilize the developed colors for fixing.

The driving time, the color development intensity, and the heating temperature of the color development unit 2, the first to third color erasure units 3-5, and the fixing unit 6 are controlled, respectively, by a color development control circuit 111, a color erasure control circuit 112, and a fixing control circuit 113 in the image formation control unit 110.

To draw an image, the color erasure control circuit 112 reads drawing data from a drawing image memory 131, turns on/off the lights focused by the first to third color erasure units 3-5, and controls the intensity of the lights. At this time, the color erasure control circuit 112 acquires the rotation information from a rotation control circuit 130 and controls the positions on the label side 21 on which lights are focused.

The recording medium device 10 has a configuration in which an optical pickup 7 is provided in the position opposed to the information recording side of the recording medium 20 and this pickup 7 is linearly moved in the radius direction of the recording medium 20 by a linear driving device 9. The driving time and the movement speed of the optical pickup 7 and the linear driving device 9 are controlled by a recording control circuit 121 and a linear movement control circuit 122 in an information recording control unit 120.

The recording medium 20 is rotated and driven by a rotation driving device 8, and its rotation is controlled by the rotation control circuit 130.

To record information, the recording control circuit 121 reads data from an information recording memory 132 and controls the optical pickup 7. At this time, the recording control circuit 121 acquires rotation information from the rotation control circuit 130 and controls the laser beam focused on the information recording side. To perform the linear-speed control, the recording control circuit 121 detects the position of the optical pickup 7 and feeds back this position for controlling the rotation speed.

The control circuits in the image formation control unit 110, the control circuits in the information recording control unit 120, and the rotation control circuit 130 are connected to a control unit 100 via the bus. The control unit 100 sets the speed control mode and the rotation speed that will be used by the rotation control circuit 130 based on the control modes shown in FIGS. 1A-1C and selects which control is to be performed, that is, image formation control by the image formation control unit 110 or information recording control by the information recording control unit 120. In addition, the control unit 100 controls the control circuits 111-113, 121, and 122 in the control units.

The rotation control circuit 130 rotates the rotation driving device 8 at a high speed when data is written on the information recording side of the recording medium 20 by the recording control circuit 121, and changes the rotation speed of the rotation driving device 8 to the speed for image writing by the color erasure process when an image is formed on the label side 21 of the recording medium 20 by the color erasure control circuit 112.

To draw an image on the label side 21 of the disc-shaped recording medium 20, a color development material containing photochromic compounds is applied to a disc-shaped substrate to create the recording medium 20, ultraviolet radiation is focused on the color development material, and the developed colors are fixed at a temperature higher than a predetermined temperature.

The photochromic compound has its hue changed by focusing a light of a specific wavelength. For example, reversible photochromic compounds, which develop colors by ultraviolet radiation and have those colors erased by visible lights, are known. For full-color representation by means of a color development material containing the photochromic compounds, three types of photochromic compounds are used where the absorption peak wavelengths in the developed state are about 400 nm-500 nm, 500 nm-600 nm, and 600 nm-700 nm, respectively. The photochromic compound with the wavelength range of 400 nm-500 nm is used as a color development material that develops yellow. The photochromic compound with the wavelength range of 500 nm-600 nm is used as a color development material that develops magenta. The photochromic compound with the wavelength range of 600 nm-700 nm is used as a color development material that develops cyan.

When all three types of photochromic compounds develop colors, the black color is displayed because the lights in the wavelength regions of yellow, magenta, and cyan are all absorbed. The blue color is displayed when only the color development material of yellow is erased. The green color is displayed when only the color development material of magenta is erased. The red color is displayed when only the color development material of cyan is erased.

A colors drawn as an image may be determined by selecting from the photochromic compounds described above. For example, a color development material containing all three types of photochromic compounds are used, an image may be drawn in black.

The color development layer may be a mixture of the photochromic compounds and resin such as polyethylene, polycarbonate, and polymethylmethacrylate. The color development layer may be formed on a recording medium, for example, by applying (such as dipping or blade-coating), spin-coating, or printing the layer on the medium. In addition, a protective layer made of polyvinyl alcohol, silicone resin, or acrylate resin may be provided on the color development layer. Those configurations of those color development layer are described, for example, in Patent Document 2.

Figure 3:
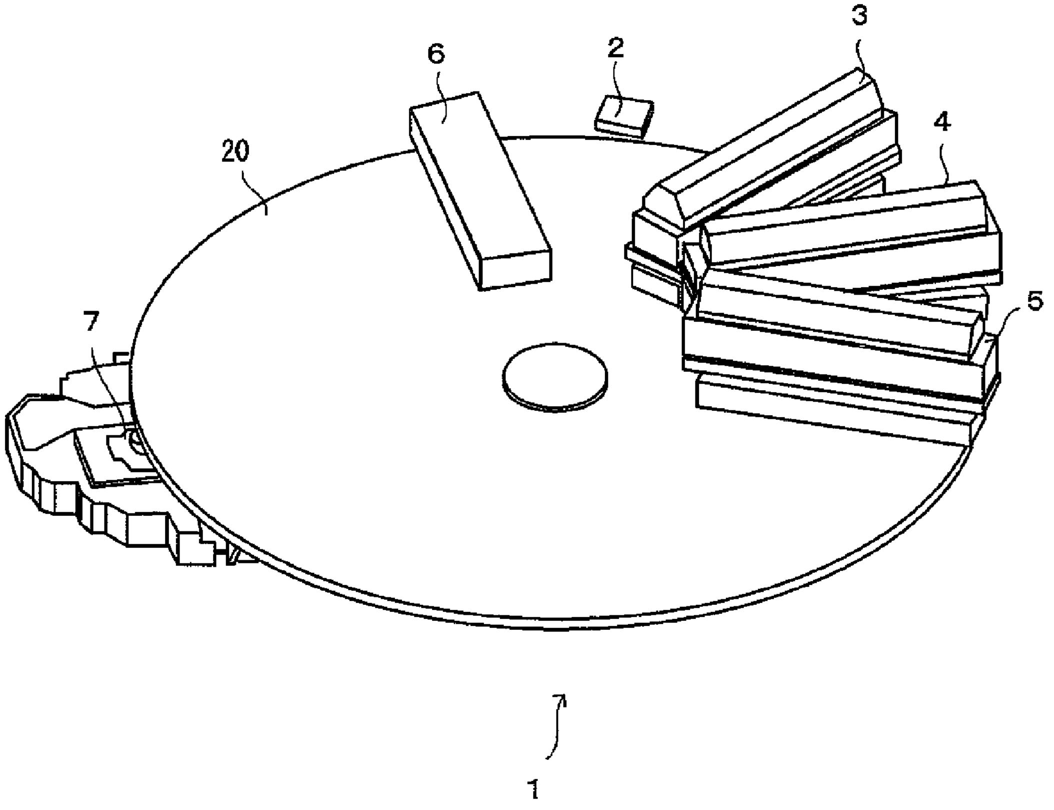
FIG. 3 is a general perspective view showing the general configuration of an image formation device of the present invention.
Figure 4:
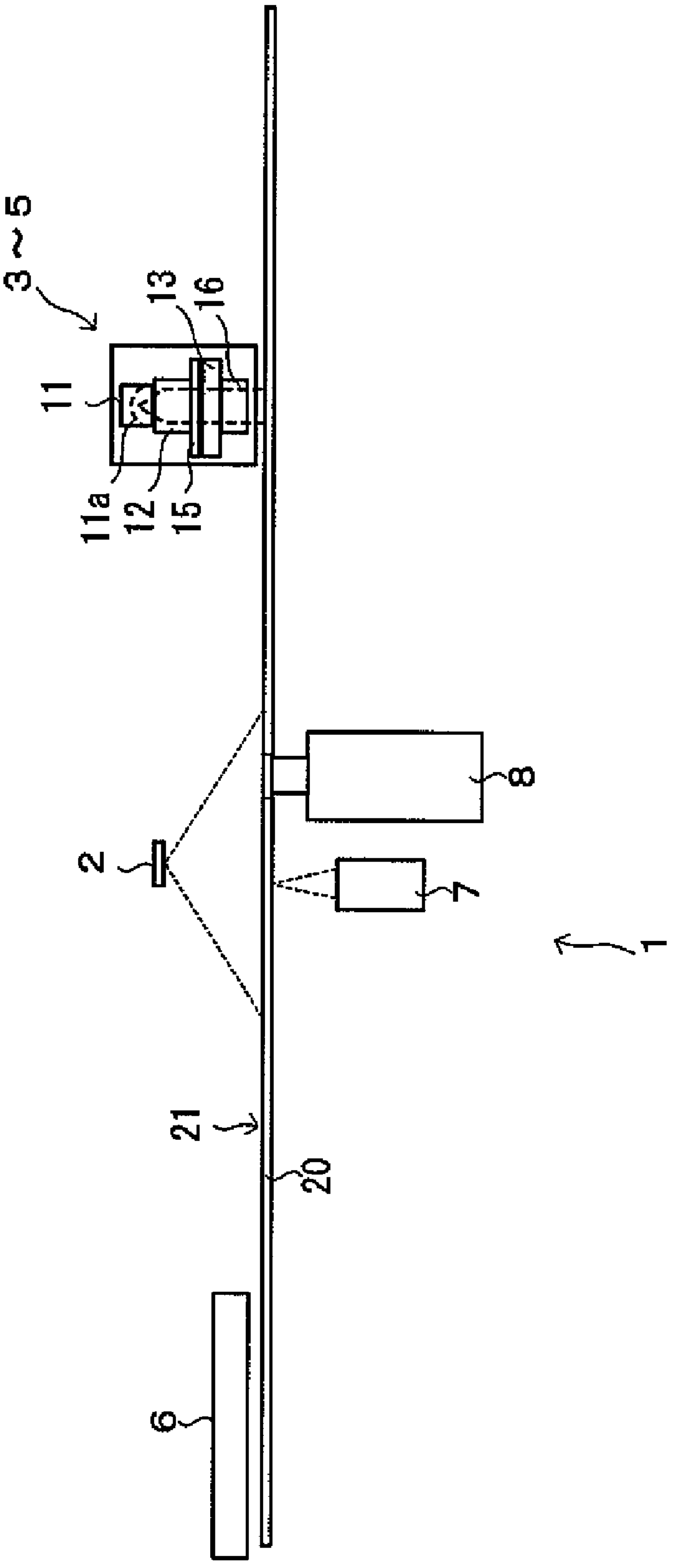
FIG. 4 is a general cross section view showing the general configuration of the image formation device of the present invention.

Next, the following describes the general configuration of the image formation device of the present invention with reference to the general perspective view in FIG. 3 and the general cross section view in FIG. 4.

Referring to the general configuration diagram of the image formation device shown in FIG. 3, the image formation device 1 comprises a mechanism (not shown) that rotates the recording medium 20 and the pickup 7 that optically records information on the information recording side of the recording medium 20. Based on data to be recorded, the pickup 7 focuses a laser beam on the information recording side of the recording medium 20 for recording. The recorded data includes various types of data such as image data, sounds, music data, and text data.

Note that the mechanism that drives the recording medium 20, the mechanism that drives the pickup 7 across the recording medium 20, and the signal processing device that converts recording data to a laser beam are not shown in the image formation device 1 in FIG. 3.

A color development material (photochromic) is applied to at least one of the sides of the recording medium 20. This photochromic compound is a material having properties that, when exposed to ultraviolet radiation, develop colors and that have a specific color erased by focusing a light of a specific wavelength that is absorbed by the compound. For example, a material containing photochromic compounds that, when exposed to ultraviolet radiation, develop C (cyan), M (magenta), and Y (yellow) may be used.

The image formation device 1 uses the color development material, applied to the face of the recording medium 20, to form an image on the face of the disc-shaped recording medium 20. The image formation device 1 has a configuration for forming an image on the face of the recording medium 20. The configuration comprises the color development unit 2 that causes the color development material to develop colors, the color erasure units 3-5 that erase colors developed by the color development unit 2, and the fixing unit 6 that fixes the developed colors, with those units sequentially arranged in the rotation direction of the recording medium 20.

To form an image on the recording medium 20 to which the color development material (photochromic) is applied for developing colors by focusing ultraviolet radiation described above, the color development unit 2 comprises a light source for emitting a light of the wavelength of ultraviolet radiation. The wavelength of a light emitted from the color development unit 2 is not limited to the wavelength of ultraviolet radiation but is dependent on the characteristics of the color development material applied to the recording medium 20.

The color erasure units 3-5, which are the first color erasure unit 3, second color erasure unit 4, and third color erasure unit 5 for erasing colors of different wavelengths, are arranged in the rotation direction of the recording medium 20.

In the configuration where a color development material containing photochromic compounds, which develop C (cyan), M (magenta), and Y (yellow) when exposed to ultraviolet radiation, is used, the three color erasure units are provided: first color erasure unit 3 that emits a visible light R (red) for erasing the developed color C (cyan), second color erasure unit 4 that emits a visible light G (green) for erasing the developed color M (magenta), and third color erasure unit 5 that emits a visible light B (blue) for erasing the developed color Y (yellow). This configuration combines color development via ultraviolet radiation with color erasure via visible lights, thus allowing three colors, that is, C (cyan), M (magenta), and Y (yellow), to be combined in various ways for color printing. Which color erasure unit 5 (1, 2, or 3) emits which visible light (R, G, or B) can be determined arbitrarily.

The wavelength of a light emitted by the color erasure units 3-5 is not limited to the wavelength of a visible light. An infrared light may also be used depending upon the characteristics of the color development material applied to the recording medium 20.

The fixing unit 6 has a heat source for fixing the colors developed by the color development material. An electrically heated wire, a ceramic heater, or a halogen lamp may be used as the heat source.

Although a multi-color image is formed by color development, color erasure, and fixing in the example described above, another configuration is also possible in which a single-color image is formed by color development and fixing. In this case, a color development material having properties that develop colors when an ultraviolet light is focused may be used as the color development material and the developed color is fixed to form an image. And, the fixing process can be performed in the period of information recording.

FIG. 4 shows the general cross section of the image formation device 1 of the present invention. Referring to FIG. 4, with the recording medium 20 as the boundary, the optical pickup 7 that focuses a laser beam on the information recording side of the recording medium 20 to record data and the rotation driving device 8 that rotates the recording medium 20 are provided below the recording medium 20 while the color development unit 2, color erasure units 3-5, and fixing unit 6 that form an image are provided above the recording medium 20. It is also possible to provide the color development unit 2, color erasure units 3-5, and fixing unit 6 on the same side of the recording medium 20 as that on which the optical pickup 7 is provided. In this case, because the information recording area for recording data is on this side of the recording medium 20, the label area in which an image is formed and printed is the area on this side except the information recording area. The color development unit 2, color erasure units 3-5, and fixing unit 6, which are provided below the recording medium 20, are installed in such a way that the lights of various wavelengths focus on an area except this information recording area.

Each of the color erasure units 3-5 comprises a light source 11, a first optical lens 12 such as an integrator lens that disperses a light emitted from the light source 11 and transmits the dispersed light to an optical shutter, a polarization direction conversion element (PBS) 15 that aligns the light polarization direction to increase the transmittance of the liquid crystal, a liquid crystal shutter 13 that constitutes the optical shutter, and a second optical lens 16 such as a SELFOC lens that creates an optical image on the label side 21 of the recording medium 20. For efficient use of the emitted light, the light source 11 may have a light reflector 11*a*.

The liquid crystal shutter 13, which has multiple pixels 14, transmits or blocks the light from the light source 11 for each pixel and forms picture elements on the recording medium 20, one for each pixel. The multiple pixels 14 are arranged as an array of at least one column in the radius direction of the recording medium 20 to form an optical line. When a light is focused once on this one-column array, one line of picture elements in the radius direction are exposed to the light on the recording medium 20. The number of picture elements in one line corresponds to the number of pixels 14. The linear array of the pixels 14 may be formed not only in one column but also in multiple columns.

Figure 5:
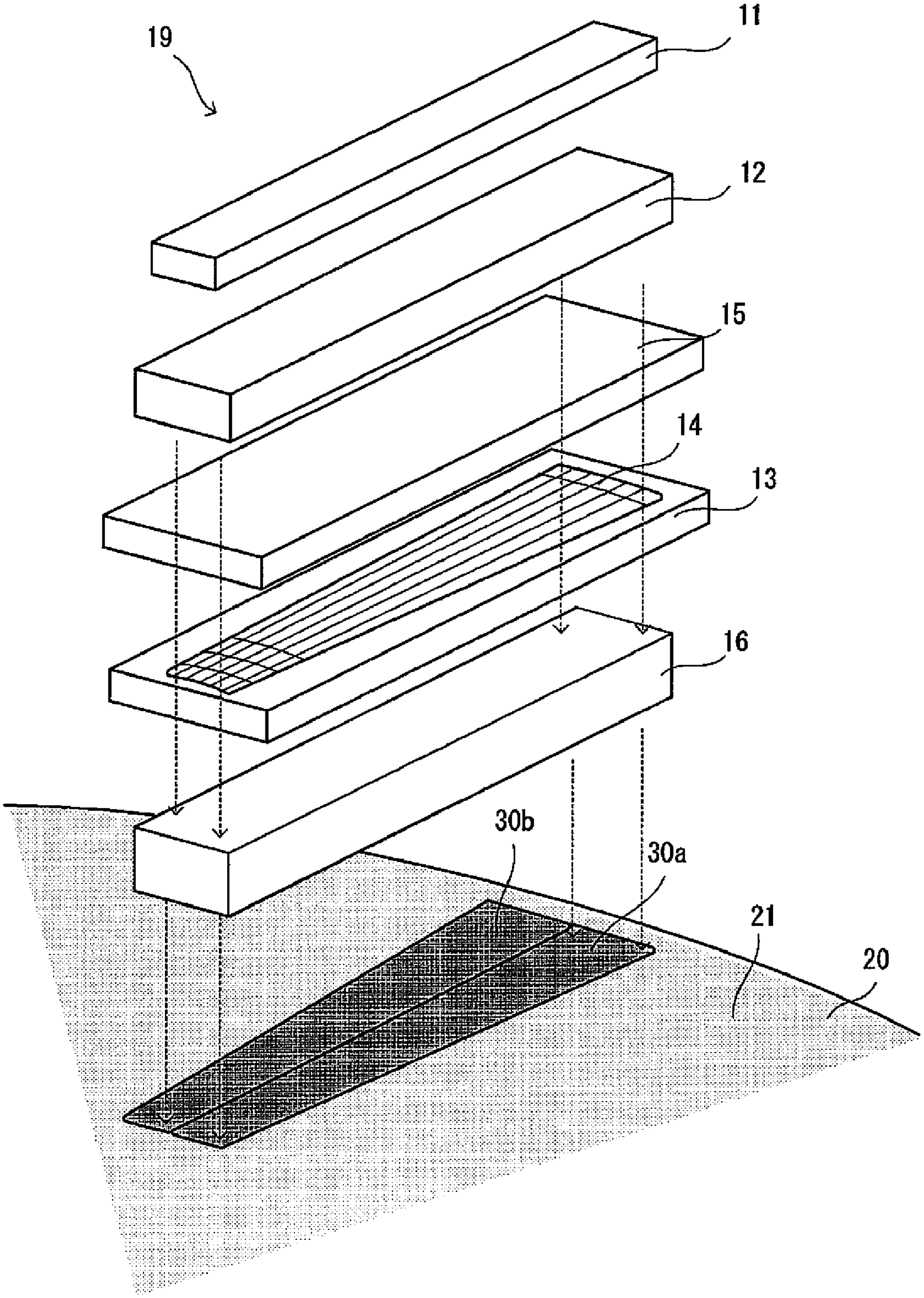
FIG. 5 is a diagram showing an example of one configuration of a color development unit constituting a color erasure unit provided in the image formation device of the present invention.

With reference to FIG. 5, the following describes an example of the configuration of an optical unit 19 that constitutes the color erasure unit included in the image formation device of the present invention. FIG. 5 is a perspective view showing an example of the configuration of the optical unit 19 in the exploded form.

As with the configuration shown in FIG. 4, the optical unit 19 in the example of this configuration comprises the light source 11, the first optical lens 12 such as an integrator lens, the polarization direction conversion element (PBS) 15, the liquid crystal shutter 13 that constitutes the optical shutter, and the second optical lens 16 such as a SELFOC lens.

The liquid crystal shutter 13 shown in the example of the configuration is formed in such a way that the circumferential width of a pixel is different between a radially inner side pixel and a radially outer side pixel to make the shape of an image formation area 30, formed on the recording medium 20, a fan-like shape. This shape prevents the light from being focused on the same position two or more times in the radially inner side to suppress unevenness in the color thickness.

In one configuration, the pixels 14 arranged linearly in the radius direction each have different widths in one line with the pixel widths getting smaller sequentially from the radially outermost side to the radially innermost side. In another configuration, the pixels 14 in one line are divided into several units of multiple equal-width pixels and the units of multiple equal-width pixels each have different pixel widths with the pixel widths getting smaller from the radially outermost side to the radially innermost side.

Making the width of a radially inner pixel smaller than the width of a radially outer pixel in the pixel column linearly arranged along the radius direction makes the shape of a light, transmitted through the liquid crystal shutter 13, a fan-like shape which has the smaller radially inner side and the larger radially outer side. The light transmitted through the liquid crystal shutter 13 focuses on the label side 21 of the recording medium 20 for image formation, with the result that the image formation area 30 created by this image formation has a fan-like shape.

In FIG. 5, an image formation area 30*a* indicates the area on the label side 21 of the recording medium 20 where an image is formed when the optical unit is in the position shown in the figure. An image formation area 30*b* indicates the area where a light will be focused next to form an image.

Figure 6:
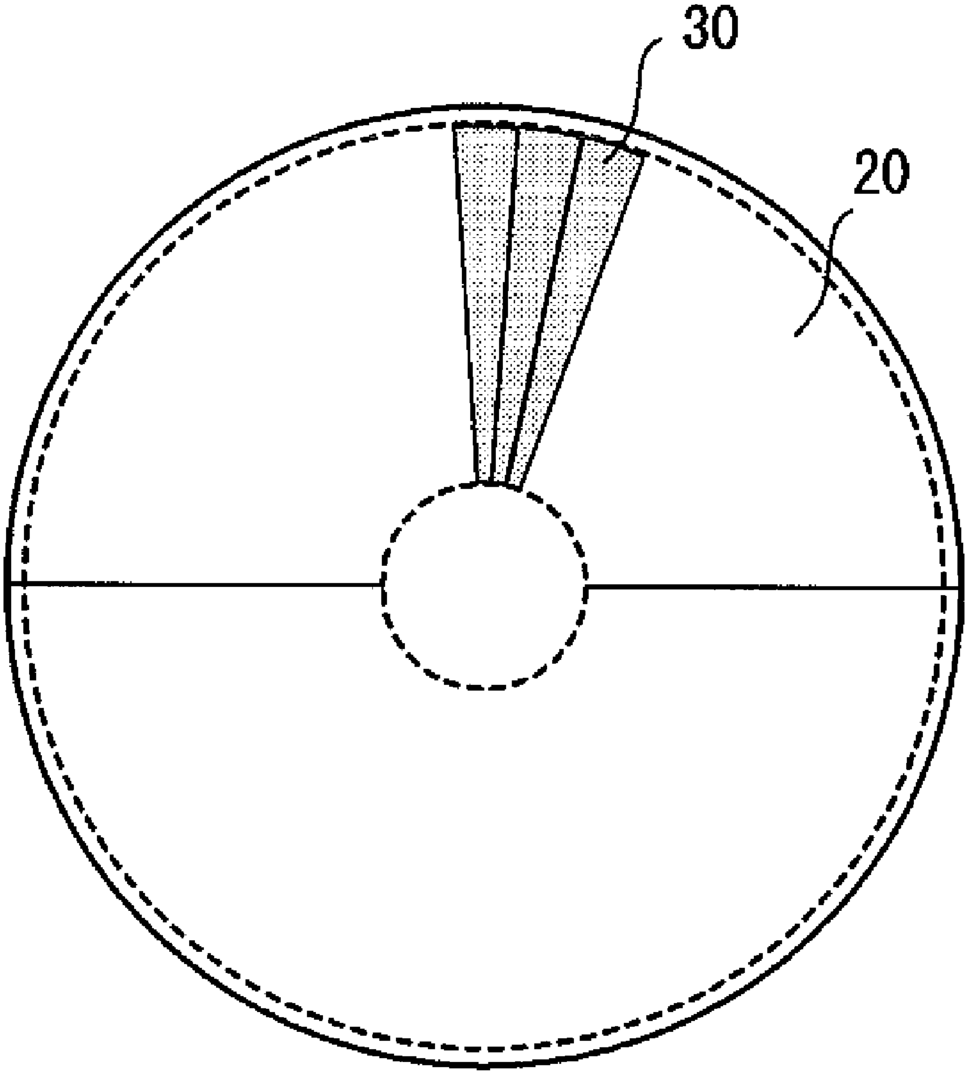
FIG. 6 is a diagram showing the relation between a recording medium and image formation areas.
Figure 7A:
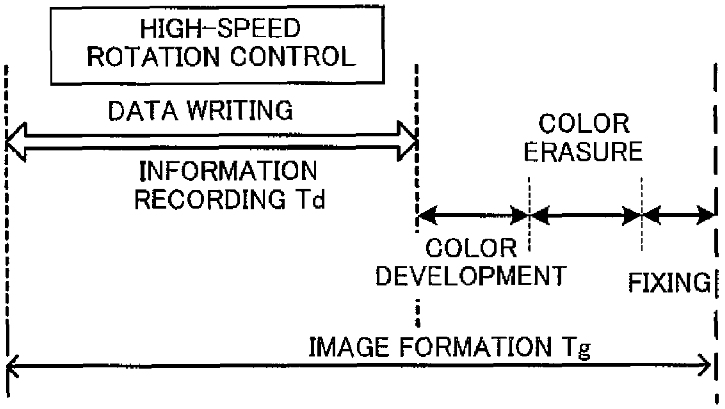
FIG. 7 is a diagram showing the relation between the processing time of image formation and the processing time of information recording.
Figure 7B:
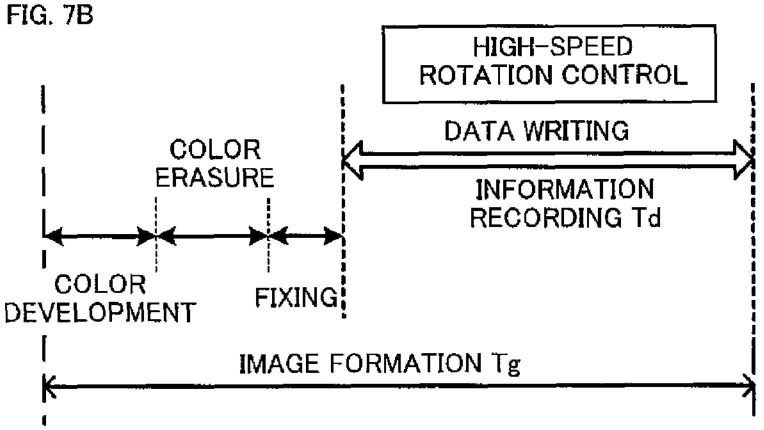

FIG. 6 shows the relation between a recording medium and image formation areas. Repeatedly forming an image in the fan-shaped image formation area 30 by means of the optical unit with the recording medium 20 rotating allows an image to be formed on the whole surface of the recording medium 20. The fan-shaped image formation area 30, which has a smaller inner side, prevents the light from being exposed multiple times in the same position.

The invention claimed is:

1. An image formation device that has a recording unit for recording information and that forms an image by developing a color development layer on a disc-shaped recording medium, said color development layer reacting to a light, said image formation device comprising:

a color development unit that develops colors by focusing a light on the color development layer;

erasure units, each including a recording head linearly-arranged along a radial direction of the disc-shaped recording medium, that selectively erase the developed colors by focusing a light on the developed color development layer, when the recording medium has an angular speed controlled to be at a constant rotation angle, to create the image on the recording medium; and a fixing unit that fixes the image formed by the erasure units, wherein said color development unit or said fixing unit performs processing simultaneously with information being recorded on the recording medium.

2. The image formation device according to claim 1 wherein said recording unit records information on the recording medium in a first information recording period and in a second information recording period, said processing of said color development unit is performed in the first information recording period, and said processing of said fixing unit is performed in the second information recording period.

3. The image formation device according to one of claims 1 and 2 wherein said color development layer is formed by applying a color development material containing photochromic compounds onto a disc-shaped recording medium, said color development unit comprises light focusing means for focusing a first light within a predetermined angular range on the recording medium, said erasure units each comprise optical focusing means for focusing a second light of a wavelength different from a wavelength of the first light within a predetermined angular range on the recording medium, and said fixing unit comprises heating means for heating the recording medium to a predetermined temperature.

4. An image formation method that uses a recording unit for recording information and that forms an image by developing a color development layer on a disc-shaped recording medium, said color development layer reacting to a light, said image formation method comprising the steps of:

developing colors by focusing a light on the color development layer;

selectively erasing the developed colors, using a recording head linearly-arranged along a radial direction of the disc-shaped recording medium, by focusing a light on the developed color development layer, when the recording medium has an angular speed controlled to be at a constant rotation angle, to create the image on the recording medium; and fixing the image formed by said selectively erasing, wherein said step of developing colors or said step of fixing performs processing simultaneously with information being recorded on the recording medium.

5. The image formation method according to claim 4 wherein said recording unit records information on the recording medium in a first information recording period and in a second information recording period, said step of developing colors performs processing in the first information recording period, and said step of fixing performs processing in the second information recording period.

6. The image formation method according to one of claims 4 and 5 wherein said color development layer is formed by applying a color development material containing photochromic compounds onto a disc-shaped recording medium, in said step of developing colors, a first light is focused within a predetermined angular range on the recording medium, in said step of erasing the developed colors, a second light of a wavelength different from a wavelength of the first light is focused within a predetermined angular range on the recording medium, and in said step of fixing, the recording medium is heated to a predetermined temperature.

* * * * *